US012020364B1

(12) United States Patent
Orzan et al.

(10) Patent No.: US 12,020,364 B1
(45) Date of Patent: Jun. 25, 2024

(54) SYSTEMS, METHODS, AND MEDIA FOR MODIFYING THE COLORING OF IMAGES UTILIZING MACHINE LEARNING

(71) Applicant: Bentley Systems, Incorporated, Exton, PA (US)

(72) Inventors: Alexandrina Orzan, Nice (FR); Hugo Lavezac, Villeneuve-loubet (FR); Prince Ngattai Lam, Paris (FR); Luc Robert, Valbonne (FR)

(73) Assignee: Bentley Systems, Incorporated, Exton, PA (US)

( * ) Notice: Subject to any disclaimer, the term of this patent is extended or adjusted under 35 U.S.C. 154(b) by 103 days.

(21) Appl. No.: 17/715,500

(22) Filed: Apr. 7, 2022

(51) Int. Cl.
*G06T 15/04* (2011.01)
*G06T 3/40* (2006.01)
*G06T 7/90* (2017.01)

(52) U.S. Cl.
CPC .............. *G06T 15/04* (2013.01); *G06T 3/40* (2013.01); *G06T 7/90* (2017.01); *G06T 2207/10152* (2013.01); *G06T 2207/20081* (2013.01)

(58) Field of Classification Search
CPC .. G06T 15/04; G06T 7/90; G06T 3/40; G06T 2207/10152; G06T 2207/20081
See application file for complete search history.

(56) References Cited

U.S. PATENT DOCUMENTS

| 10,013,801 | B2 | 7/2018 | Mehr | |
|---|---|---|---|---|
| 2017/0213112 | A1* | 7/2017 | Sachs | G06N 3/045 |
| 2019/0188535 | A1* | 6/2019 | Chen | G06T 5/00 |
| 2020/0302656 | A1* | 9/2020 | Kumar | G06F 3/04845 |
| 2020/0405269 | A1* | 12/2020 | Swisher | G06N 3/04 |
| 2021/0360179 | A1* | 11/2021 | Dangi | H04N 25/60 |
| 2021/0383505 | A1* | 12/2021 | Pottorff | G06T 5/20 |

(Continued)

OTHER PUBLICATIONS

Dostal, Christopher, and Kotaro Yamafune. "Photogrammetric texture mapping: A method for increasing the Fidelity of 3D models of cultural heritage materials." Journal of Archaeological Science: Reports 18 (2018) 7 pages.

(Continued)

*Primary Examiner* — Yu Chen
(74) *Attorney, Agent, or Firm* — Cesari and McKenna, LLP (57) ABSTRACT

Techniques are provided for modifying coloring of images utilizing machine learning. A trained model is generated utilizing machine learning with training data that includes images of a plurality of different scenes with different illumination characteristics. New original images of a scene may each be downsampled and transformed to a corresponding output image utilizing the trained model. A color transformation from each original image to its corresponding output image may be determined. In an embodiment, the color transformation is determined utilizing a spline fitting approach. The determined color transformations may be applied to each of the original images to generate corrected images. Specifically, the color transformation that is applied to a particular original image is the color transformation determined for the input image that corresponds to the particular original image. The corrected images are utilized to generate a digital model of the scene, and the digital model has accurate model texture.

20 Claims, 6 Drawing Sheets

(56) References Cited

U.S. PATENT DOCUMENTS

| | | | | |
|---|---|---|---|---|
| 2022/0108423 | A1* | 4/2022 | Sivaraj | G06T 11/001 |
| 2022/0138988 | A1* | 5/2022 | Stengel | G06T 9/00 345/426 |
| 2022/0222873 | A1* | 7/2022 | Shreshtha | G06T 7/0012 |
| 2022/0261968 | A1* | 8/2022 | Yan | G06V 10/82 |
| 2023/0040256 | A1* | 2/2023 | Wu | G06T 3/0006 |
| 2023/0146181 | A1* | 5/2023 | Meshkin | G06F 18/214 382/274 |
| 2023/0239553 | A1* | 7/2023 | Galor Gluskin | H04N 23/16 348/164 |
| 2023/0325717 | A1* | 10/2023 | Ulasen | G06N 20/00 706/12 |

OTHER PUBLICATIONS

Hanusch, Thomas. "A new texture mapping algorithm for photorealistic reconstruction of 3D objects." *International Archives of the Photogrammetry, Remote Sensing and Spatial Information Sciences* 37, No. B5 (2008), 9 pages.

Jung, Jae-Il, and Yo-Sung Ho. "Geometric and colorimetric error compensation for multi-view images." *Journal of Visual Communication and Image Representation* 25, No. 4 (2014), 12 pages.

Kuse, Manohar, and Sunil Prasad Jaiswal. "Graph modelling of 3D geometric information for color consistency of multiview images." *In IEEE International Conference on Image Processing (ICIP)*, pp. 1394-1398 (2015).

Shen, Tianwei, Jinglu Wang, Tian Fang, Siyu Zhu, and Long Quan. "Color correction for image-based modeling in the large." *In Asian Conference on Computer Vision*, pp. 392-407. Springer (2016).

Shin, Dong-Won, and Yo-Sung Ho. "Color correction using 3D multi-view geometry." In *Color Imaging XX: Displaying, Processing, Hardcopy, and Applications*, vol. 9395, p. 93950O. International Society for Optics and Photonics (2015), 9 pages.

Yang, Junxing, Lulu Liu, Jiabin Xu, Yi Wang, and Fei Deng. "Efficient global color correction for large-scale multiple-view images in three-dimensional reconstruction." *ISPRS Journal of Photogrammetry and Remote Sensing* 173 (2021), 12 pages.

Yin, Yongkai, Hailong Chen, Xiangfeng Meng, Xiulun Yang, and Xiang Peng. "Texture mapping based on photogrammetric reconstruction of the coded markers." *Applied optics* 58, No. 5 (2019) 8 pages.

Farbman, Zeev, and Dani Lischinski. "Tonal stabilization of video." *ACM Transactions on Graphics (TOG)* 30, No. 4 (2011) 9 pages.

Faridul, Hasan Sheikh, Tania Pouli, Christel Chamaret, Jürgen Stauder, Alain Tremeau, and Erik Reinhard. "A Survey of Color Mapping and its Applications." *Eurographics (State of the Art Reports)* 3, No. 2 (2014) 25 pages.

HaCohen, Yoav, Eli Shechtman, Dan B. Goldman, and Dani Lischinski. "Non-rigid dense correspondence with applications for image enhancement." *ACM transactions on graphics (TOG)* 30, No. 4 (2011) 10 pages.

HaCohen, Yoav, Eli Shechtman, Dan B. Goldman, and Dani Lischinski. "Optimizing color consistency in photo collections." *ACM Transactions on Graphics (TOG)* 32, No. 4 (2013) 9 pages.

Park, Jaesik, Yu-Wing Tai, Sudipta N. Sinha, and In So Kweon. "Efficient and robust color consistency for community photo collections." In *Proceedings of the IEEE Conference on Computer Vision and Pattern Recognition*, pp. 430-438 (2016).

Vazquez-Corral, Javier, and Marcelo Bertalmío. "Color stabilization along time and across shots of the same scene, for one or several cameras of unknown specifications." *IEEE Transactions on Image Processing* 23, No. 10 (2014) 12 pages.

Xia, Menghan, Jian Yao, Renping Xie, Mi Zhang, and Jinsheng Xiao. "Color consistency correction based on remapping optimization for image stitching." In *Proceedings of the IEEE International Conference on Computer Vision Workshops*, pp. 2977-2984 (2017).

Afifi, Mahmoud, et al. "Learning Multi-Scale Photo Exposure Correction." *Proceedings of the IEEE/CVF Conference on Computer Vision and Pattern Recognition* (2021) 11 pages.

Afifi, Mahmoud, and Michael S. Brown. "Deep white-balance editing. " *Proceedings of the IEEE/CVF Conference on computer vision and pattern recognition* (2020) 10 pages.

Chen, Yu-Sheng, Yu-Ching Wang, Man-Hsin Kao, and Yung-Yu Chuang. "Deep photo enhancer: Unpaired learning for image enhancement from photographs with GANs." In *Proceedings of the IEEE Conference on Computer Vision and Pattern Recognition*, pp. 6306-6314 (2018).

Gharbi, Michaël, Jiawen Chen, Jonathan T. Barron, Samuel W. Hasinoff, and Fredo Durand. "Deep bilateral learning for real-time image enhancement." *ACM Transactions on Graphics (TOG)* 36, No. 4 (2017) 12 pages.

Isola, Phillip, Jun-Yan Zhu, Tinghui Zhou, and Alexei A. Efros. "Image-to-image translation with conditional adversarial networks." In *Proceedings of the IEEE conference on computer vision and pattern recognition*, pp. 1125-1134 (2017) 10 pages.

Jiang, Yifan, Xinyu Gong, Ding Liu, Yu Cheng, Chen Fang, Xiaohui Shen, Jianchao Yang, Pan Zhou, and Zhangyang Wang. "Enlightengan: Deep light enhancement without paired supervision." *IEEE Transactions on Image Processing* 30 (2021) 11 pages.

Luan, Fujun, Sylvain Paris, Eli Shechtman, and Kavita Bala. "Deep photo style transfer." In *Proceedings of the IEEE conference on computer vision and pattern recognition*, pp. 4990-4998 (2017).

Tsai, Yi-Hsuan, Xiaohui Shen, Zhe Lin, Kalyan Sunkavalli, Xin Lu, and Ming-Hsuan Yang. "Deep image harmonization." In *Proceedings of the IEEE Conference on Computer Vision and Pattern Recognition*, pp. 3789-3797 (2017).

Wang, Ruixing, Qing Zhang, Chi-Wing Fu, Xiaoyong Shen, Wei-Shi Zheng, and Jiaya Jia. "Underexposed photo enhancement using deep illumination estimation." In *Proceedings of the IEEE/CVF Conference on Computer Vision and Pattern Recognition*, pp. 6849-6857 (2019).

Yan, Zhicheng, Hao Zhang, Baoyuan Wang, Sylvain Paris, and Yizhou Yu. "Automatic photo adjustment using deep neural networks." *ACM Transactions on Graphics (TOG)* 35, No. 2 (2016) 15 pages.

* cited by examiner

SYSTEMS, METHODS, AND MEDIA FOR MODIFYING THE COLORING OF IMAGES UTILIZING MACHINE LEARNING

BACKGROUND

Technical Field

The present disclosure relates generally to digital image processing, and more specifically to modifying the coloring of images utilizing machine learning.

Background Information

In the design, construction and/or operation of infrastructure (e.g., buildings, factories, roads, railways, bridges, electrical and communication networks, equipment, etc.) it is often desirable to create models, e.g., three-dimensional (3D) high-resolution models, of a scene in which the infrastructure is built, or planned to be built.

Particular applications can produce the 3D models of the scene utilizing images, e.g., ordinary photographs. Specifically, the applications can use the pixels from the images to not only construct the shape of the 3D model, but to also construct the texture of the 3D model. However, in many instances, the images utilized to produce the 3D model are taken with varying light conditions and different camera parameters (e.g., exposure), which can result in unsightly/inaccurate color variations and/or other deficiencies in the texture of the model. As a result, the user is detracted from using the model since the texture is not a reliable and accurate representation of the objects in the scene.

Therefore, what is needed is a technique for modifying images such that the texture of the model is accurate when the model of the scene is generated from the images.

SUMMARY

Techniques are provided for modifying the coloring of images utilizing machine learning to generate corrected images. The corrected images can then be utilized to generate a model, e.g., a 3D model, of a scene, wherein the texture of the model accurately represents the physical objects in the scene and does not include unsightly/inaccurate color variations and/or other deficiencies.

In an embodiment, a machine learning (ML) unit may generate a trained model utilizing training data. Specifically, the ML unit may generate input training data that includes a set of images of a plurality of different scenes. Each set of images may be from the same vantage point of the scene with different illumination characteristics. For example, the different illumination characteristics may include, but are not limited to, different lighting variants and different color temperatures. Additionally, the training data may include output training data. The output training data may include a plurality of output training data images. Each of the plurality of output training data images may have a target illumination and may correspond to a scene utilized in the input training data. The ML unit may determine/learn an illumination modification from each image of the input training data to its corresponding output image. The determined/learned illumination modifications may be stored as a trained model such that any new input image may be transformed, based on the determined/learned modifications, to an output image with a transformed illumination.

An image modifier module may receive a plurality of images, i.e., original images, of any scene. The original images may be taken with different lighting conditions (e.g., color temperatures) and with different cameras having different camera parameters (e.g. exposure). Each of the plurality of images may have an original size and original resolution. The image modifier module may downsample each of the original images to generate input images that may be provided as input to the trained model. The trained model may transform each input image to a corresponding output image utilizing the determined/trained illumination modifications. The image modifier module may utilize a spline fitting approach to determine the color transformation from each input image to its corresponding output image.

The image modifier module may modify the color of each original image utilizing a determined color transformation to generate corrected images. Specifically, the color transformation that is applied to a particular original image is the color transformation determined for the input image that corresponds to the particular original image.

Further, and optionally, the image modifier module may adjust the colorimetry of the corrected images using a reference image having a desired colorimetry, i.e., a reference colorimetry. In an embodiment, the selected image is a particular original image or an input image that is generated from the particular original image. That is, the particular original image and the input image generated from the particular original image have the same colorimetry, i.e., reference colorimetry. As such, and optionally, the colorimetry of the corrected images can be adjusted to substantially match the desired reference colorimetry.

A model generator module may utilize the corrected images to generate a model of the scene. Because the color of the images utilized to generate the model of the scene are corrected utilizing the trained model that considers different light and color variants, the texture of the generated model accurately represents the surfaces of the physical objects in the scene and does not include unsightly/inaccurate color variations and/or other deficiencies. That is, and with conventional techniques, the original images that are taken with varying light conditions and different camera parameters (e.g., exposure) are utilized to generate the model. The original images lack harmonization because of the varying light conditions and camera parameters. As such, the texture of the model generated from these original images can include unsightly/inaccurate color variations and/or other deficiencies.

Therefore, the one or more embodiments described herein provide an improvement in the existing technological field of digital image processing and digital model generation by generating corrected images that can be utilized to generate a digital model with accurate texture.

BRIEF DESCRIPTION OF THE DRAWINGS

The description below refers to the accompanying drawings, of which.

DETAILED DESCRIPTION OF AN
ILLUSTRATIVE EMBODIMENT

Figure 1:
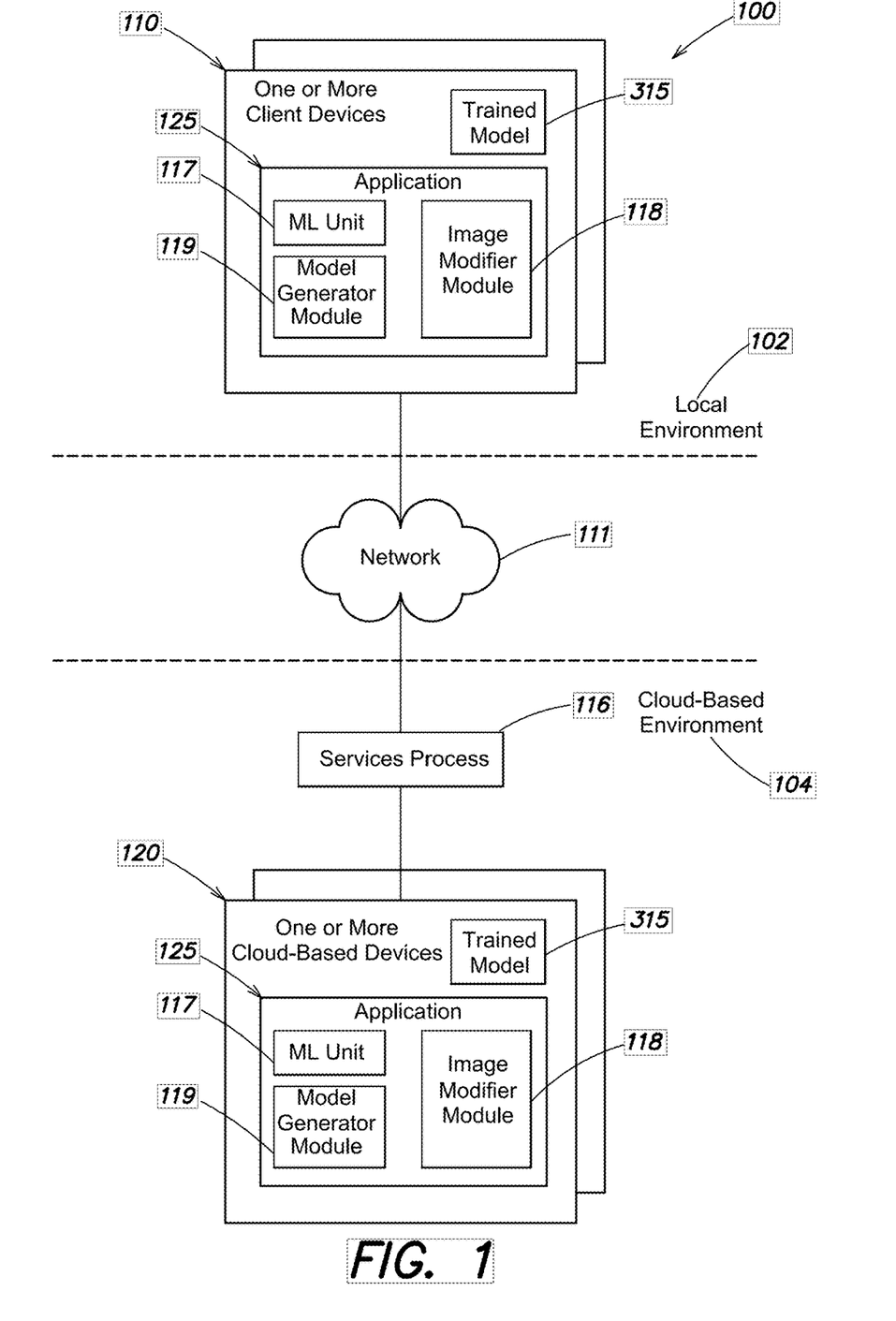
FIG. 1 is a high-level block diagram of an example architecture for modifying the coloring of images utilizing machine learning according to one or more embodiments described herein.

FIG. 1 is a high-level block diagram of an example architecture 100 for modifying the coloring of images utilizing machine learning according to one or more embodiments described herein. The architecture 100 may be divided into a local environment 102 that includes one or more local client devices 110 that are local to an end-user, and a cloud-based environment 104 that includes one or more cloud-based client devices 120 that are remote from the end-user and that are accessible to the end-user via a network 111 (e.g., the Internet). Each computing device, e.g., one or more local client devices 110 and one or more cloud-based client devices 120, may include processors, memory/storage, a display screen, and other hardware (not shown) for executing software/modules, storing data, and/or displaying information.

A local client device 110 may provide a variety of user interfaces and non-processing intensive functions. For example, a local client device 110 may provide a user interface, e.g., a graphical user interface and/or a command line interface, for receiving user input and displaying output according to the one or more embodiments described herein. A services process 116 may coordinate operation of the one or more local client devices 110 and the one or more cloud-based client devices 120 such that, for example, the one or more local client devices 110 may communicate with and access the one or more cloud-based client devices 120 via network 111.

The one or more client devices 110 and/or one or more cloud-based client devices 120 may store and execute application 125 that may modify the coloring of images utilizing machine learning according to one or more embodiments described herein. In an embodiment, the application 125 may be imaging and/or modeling software that includes a modeling/simulation environment that may generate a model of a scene including one or more physical structures and simulate a behavior of the physical structure. For example, the modeling software may be the ContextCapture™ application available from Bentley Systems, Inc., which processes images to generate high-resolution 3D models (e.g., a 3D mesh) of a scene. In an alternatively embodiment, the application 125 may be any other application that processes images and is developed by a different vendor. As used herein, the term "scene" may refer to a portion of a physical environment. A scene may include infrastructure (e.g., buildings, factories, roads, railways, bridges, electrical and communication networks, equipment, etc.), terrain (e.g., earth, rock, water, etc.), and/or other physical features and objects.

In an implementation, the one or more local client devices 110 may download and store application 125 that modifies the coloring of images utilizing machine learning according to the one or more embodiments described herein. In an implementation, the one or more local client devices 110 may utilize one or more user interfaces to access, via services process 116, the application 125 that is stored on the one or more cloud-based client devices 120 and that modifies the coloring of images utilizing machine learning according to the one or more embodiments described herein.

The application 125 may include a machine learning (ML) unit 117, an image modifier module 118, and a model generator module 119. The ML unit 117 may generate trained model 315 according to the one or more embodiments described herein and as described in further detail below. In an embodiment, the trained model 315 may be generated utilizing supervised learning that includes training data. In an implementation, the trained model 315 may be stored on client device 110 and/or cloud-based device 120. In addition or alternatively, the generated model may be stored on external storage (not shown).

The image modifier module 118 may utilize the trained model 315 with an algorithm to modify the coloring of new images to generate corrected images according to the one or more embodiments described herein and as described in further detail below. The model generator module 119 may utilize one or more corrected images to generate a model of a scene with accurate model texture according to the one or more embodiments described herein and as described in further detail below.

Because the color of the images utilized to generate the model of the scene are corrected utilizing the trained model 315 that considers different light and color variants, the texture of the generated model accurately represents the surfaces of the physical objects in the scene and does not include unsightly/inaccurate color variations and/or other deficiencies.

Although FIG. 1 depicts the ML unit 117, image modifier module 118, and model generator module 119 being separate entities of application 125, it is expressly contemplated that the functionalities of ML unit 117, image modifier module 118, and model generator module 119 may be performed by a single entity/process according to the one or more embodiments described herein. Additionally, it is expressly contemplated that each of the ML unit 117, image modifier module 118, and model generator module 119 may be hardware, software, or a combination thereof. In an embodiment, the processor (not shown) of a local client device 110 may be coupled to the memory (not shown) of the local client device 110, wherein the processor is configured to execute the ML unit 117, the image modifier module 118, and/or the model generator module 119. In addition or alternatively, the processor (not shown) of a cloud-based client device 120 may be coupled to the memory (not shown) of the cloud-based client device 120, wherein the processor is configured to execute the ML unit 117, the image modifier module 118, and/or the model generator module 119.

Figure 2:
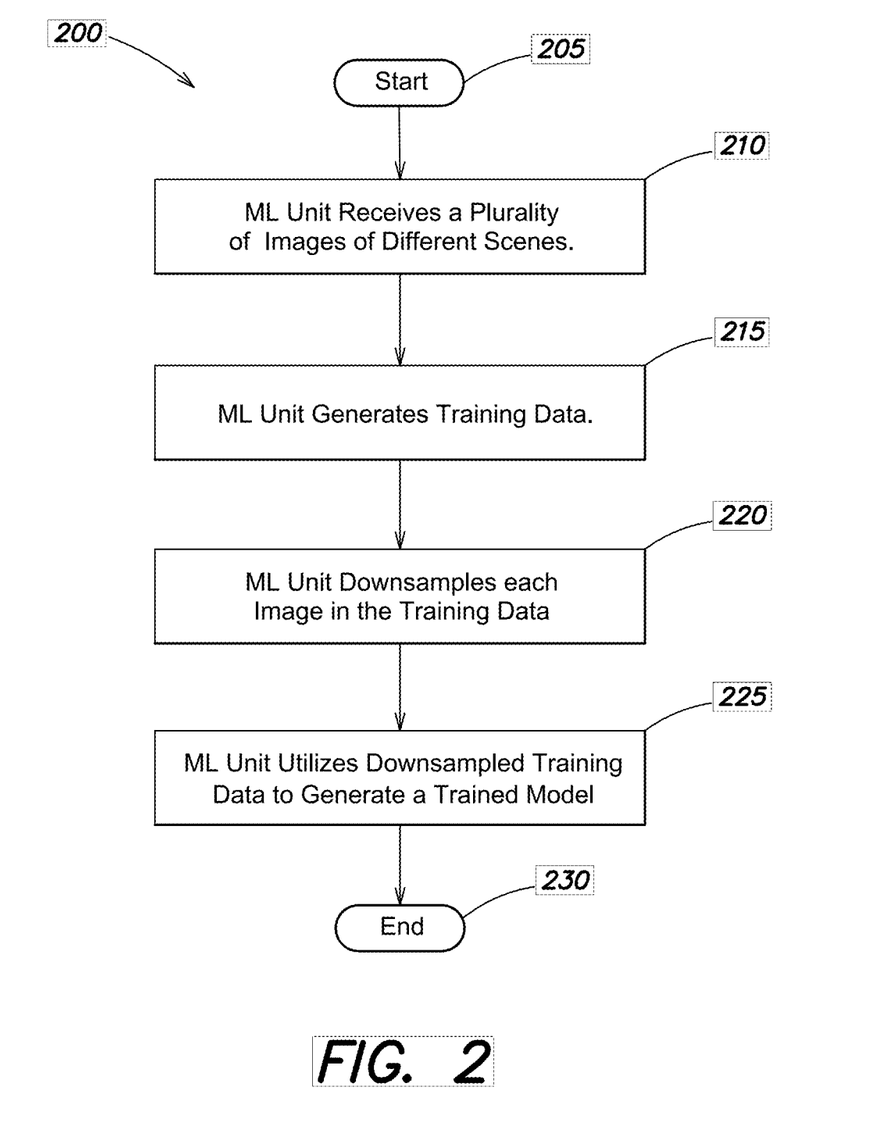
FIG. 2 is a flow diagram of a sequence of steps for generating a trained model utilizing machine learning according to the one or more embodiments described herein.

FIG. 2 is a flow diagram of a sequence of steps for generating a trained model 315 utilizing ML according to the one or more embodiments described herein. As will be described in further detail below with reference to FIGS. 4 and 5, the image modifier module 118 can implement an image modifying algorithm that utilizes the trained model 315 to modify the coloring of original images of a scene including physical objects to generate corrected images according to the one or more embodiments described herein. The model generator module 119 may then utilize the corrected images to generate a model of the scene including the objects such that the model texture accurately represents the physical objects in the scene and does not include unsightly/inaccurate color variations and/or other deficiencies.

The procedure 200 starts at step 205 and continues to step 210 where ML unit 117 receives a plurality of images of a plurality of different scenes. In an embodiment, the images may be photographs taken with varying light conditions and taken with different cameras having different parameters (e.g., exposure). According to the one or more embodiments described herein, a user operating client device 110 may utilize one or more user interfaces, generated by application 125, to provide the plurality of images of the plurality of different scenes to the ML unit 117. Alternatively, the plurality of images of the plurality of the different scenes may be prestored in memory (not shown) or external storage (not shown) and provided to the ML unit 117.

The procedure continues to step 215 and the ML unit 117 generates training data that is utilized to generate trained model 315. In an embodiment, the generated training data includes input training data and output training data. In an embodiment, the ML unit 117 generates the input training data by selecting a set of images for each of a plurality of different scenes in the received images. In an implementation, each selected image in the set of images for a scene may be from a different vantage point, i.e., angle with a known illumination characteristic. In an embodiment, each selected image in the set of images for a scene may be from the same vantage point of the scene and have one or more different illumination characteristics. In an implementation, the different illumination characteristics may include, but are not limited to, lighting variants and color variants. For example, the different light variants (i.e., different light intensities) may include under-exposed image variants of the scene (e.g., different dark lighting variants of the scene) and over-exposed image variants of the scene (e.g., different light lighting variants of the scene). Additionally, the color variants may include images of the scene with different color temperatures.

For example, let it be assumed that one of the scenes in the received images is a bridge. Accordingly, the ML unit 117 may select 12 images of the bridge from the received images for the input training data, where each selected image is from the same vantage point of the bridge but has different illumination characteristics. For example, 3 of the selected images may be over-exposed variants (e.g., dark lighting images) of the bridge with the same color temperature (i.e., same color variant). Additionally, 3 of the selected images may be under-exposed variants (e.g., light lighting images) of the bridge with the same color temperature (e.g., same color variant). Further, 6 of the selected images may have different color temperatures with the same lighting variant (e.g., same light intensity).

Figure 3:
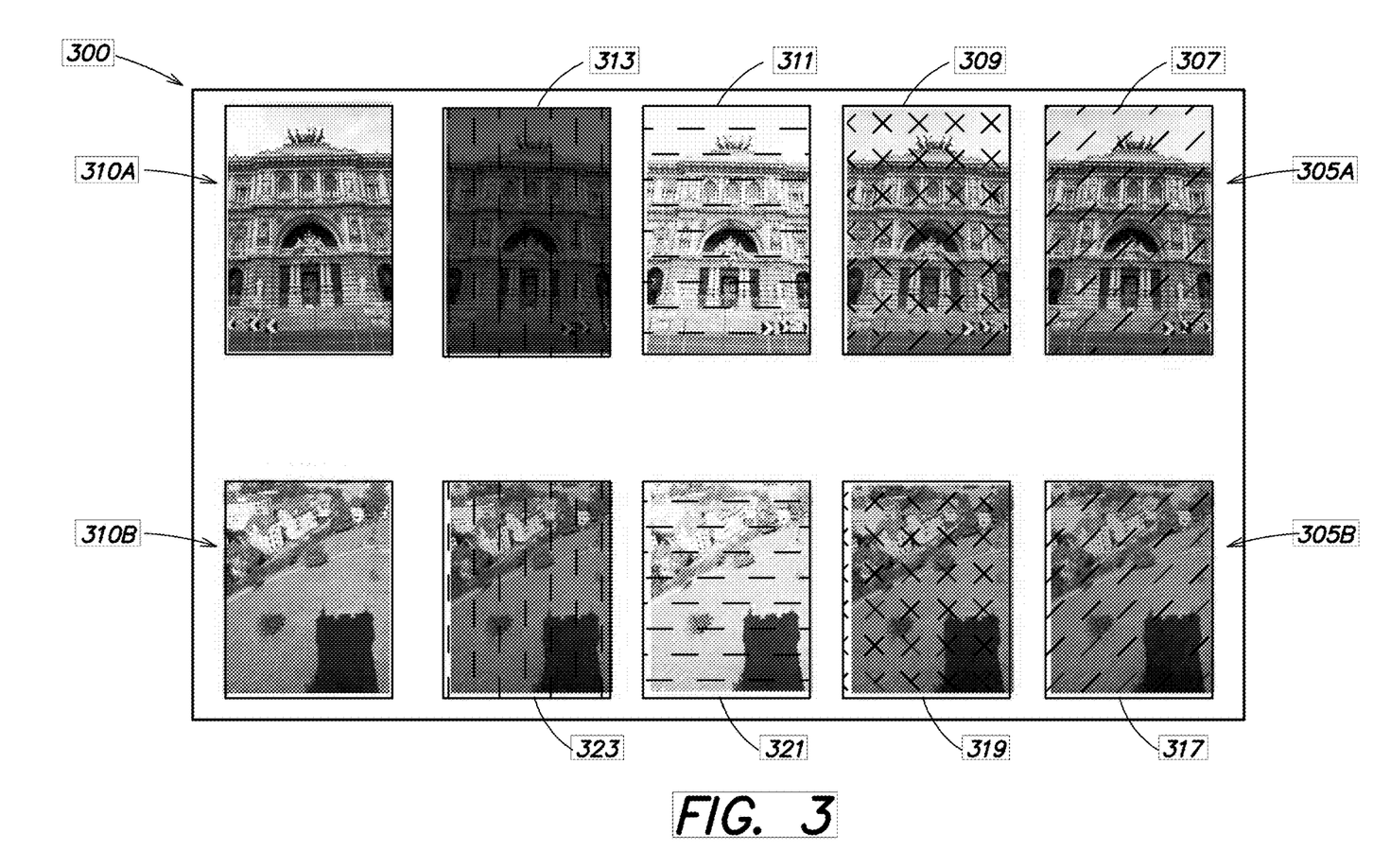
FIG. 3 is a diagram illustrating example training data that is generated according to the one or more embodiments described herein.

FIG. 3 is a diagram illustrating example training data 300 that is generated according to the one or more embodiments described herein. The training data 300 includes input training data 305 that includes set of images 305A and 305B. Further, the training data 300 includes output training data 310 that includes training data output images 310A and 310B.

For simplicity and ease of understanding, the input training data 305 includes two sets of input images and the output training data 310 includes two training data output images. However, it is expressly contemplated that the input training data 305 may include many more sets of images of different scenes with many more images in each set, and the output training data 310 may include many more output training data images.

As depicted in FIG. 3, the set of images 305A of the building includes images 307, 309, 311, and 313. Images 307, 309, 311, and 313, are all images from the same vantage point of the building. Image 307 is an image of the building with a cold color temperature and a particular lighting variant as indicated with dashed diagonal lines. Image 309 is an image of the building with a warm color temperature and the particular lighting variant, utilized in image 307, as indicated by the double dashed diagonal lines. Image 311 is an over-exposed image of the building as indicated with dashed horizontal lines. Further, image 313 is an under-exposed image of the building as indicated with vertical lines. Therefore, each image in the set of images 305A has a particular illumination characteristic. In an embodiment, the different color temperatures are used in the set of images 305A for white balancing such that images of the same scene taken on different days can be harmonized. Specifically, utilizing different color temperatures of light sources for the input training data 305 allows the ML unit 117 to remove a tint given by an illumination and recover/determine the true color of the object.

Input training data 305 also includes the set of images 305B that is an aerial view of the landscape/city. The set of images 305B includes images 317, 319, 321, and 323. Image 317 is an image that is the aerial view of the landscape/city with a cold color temperature and a particular lighting variant as indicated with dashed diagonal lines. Image 319 is an image that is the aerial view of the landscape/city with a warm lighting temperature and the particular lighting variant, utilized in image 317, as indicated by the double dashed diagonal lines. Image 321 is an over-exposed image that is the aerial view of the landscape/city as indicated with dashed horizontal lines. Further, image 323 is an under-exposed image that is the aerial view of the landscape/city as indicated with dashed vertical lines.

In addition to generating the input training data 305, the ML unit 117 may also generate output training data 310 for the training data 300. The output training data 310 may include an image for each scene included in the input training data 305, wherein each output training data image has a target illumination, e.g., a correct or desired lighting variant and/or color variant for the scene.

For example, and as depicted in FIG. 3, output training data 310 includes an output training data image 310A of the building that corresponds to set of images 305A of the input training data 305. Specifically, the output training data image 310A is an image of the building from the same vantage point as the set of images 305A with a target illumination. Additionally, the output training data image 310B is an image that is the aerial view of the landscape/city from the same vantage point as the set of images 305B with the target illumination.

In an embodiment, the target illumination of the output training data image 310A for a scene may be based on the type of scene and one or more external factors such as, but not limited to, weather, shadows, etc. For example, if the scene is a bridge on a cloudy day, the training data output image may have a particular target illumination. However, if the scene is a park on a sunny day, the training output image may have a different target illumination. In an implementation, the target illumination is the same for all the training output images of the output training data.

In an embodiment, the training data 300 used to generate the trained model 315 includes 37,000 different pairs of images, where each pair of images includes (1) an image of a scene from the input training data with a particular illumination and (2) an image of the same scene from the output training data with a target illumination. In an implementation, an output training data image may be referred to as a ground-truth image.

Referring back to FIG. 2, the procedure continues to step 220 and the ML unit 117 downsamples each image in the training data 300. In an implementation, each image of the input training data 305 and each image of the output training data 310 has an original size and resolution, and each image of the training data 300 is downsampled to an image that is 512×512 pixels. Alternatively, the images of the training data may be downsampled to other different sizes. In an implementation, the ML unit 117 utilizes a LoHalo method or a different method to downsample each image of the training data 300.

The procedure continues to step 225 and the ML unit 117 utilizes the downsampled training data to generate a trained model 315. Specifically, ML unit 117 may utilize a deep learning method to determine/learn how to modify new images by iteratively modifying each image of the input training data 305 to substantially match its corresponding output image in the output training data 310. Specifically, the ML unit 117 may compare the particular illumination characteristics of an image of the input training data 305 with the target illumination of its corresponding output image of the output training data 310. Based on the comparison, the ML unit 117 can determine/learn what illumination modifications are required to transform the input image to substantially match the output image. By performing this type of determination for each pair of input image/output image (e.g., 37,000 pairs) that make up the training data 300, the ML unit 117 can generate trained model 315 with a set of determined/learned modifications.

For example and referring back to FIG. 3, the ML unit 117 may compare the image 307 of the building with the cold temperature color and particular color variant to the output training data image 310A of the building with the target illumination. Based on the comparison, the ML unit 117 can determine/learn the illumination modification that is required to change the cold temperature and particular color variant of the image 307 to substantially match the target illumination of the output training data image 310A. The ML unit 117 may perform a similar comparison between each of the other images (e.g., images 309, 311, and 313) and the output training data image 310A to determine/learn the illumination modifications that are required to modify the particular illumination characteristics of each of the other images in set of images 305A to substantially match the target illumination of the output training data image 310A. In an implementation, each determined/learned illumination modification may be represented as a spline.

Similarly, the ML unit 117 may compare each of the images (e.g., 317, 319, 321, and 323), from the set of images 305B, with the output training data image 310B having the target illumination. Based on the comparison, the ML unit 117 may determine/learn the illumination modifications that are required to modify the particular illumination characteristics of each of the images in set of images 305B to substantially match the target illumination of the output training data image 310B.

As a result of the training, the ML unit 117 obtains a set of determined/learned illumination modifications that can be stored as generated model 315. The trained model 315 with the determined/learned illumination modifications may be stored on the client device 110, the cloud-based device 120, and/or external storage (not shown). The trained model 315 with the determined/learned modifications can be utilized to modify the illumination of any new image. The procedure then ends at step 230.

As will be described in further detail below, the image modifier module 118 may implement an image modifying algorithm that utilizes the trained model 315, e.g., the set of determined/learned modifications, to modify the coloring of new images to generate corrected images. The corrected images may then be utilized to generate a model of a scene such that the model texture accurately represents the physical objects in the scene and does not include unsightly/inaccurate color variations and/or other deficiencies.

Figure 4A:
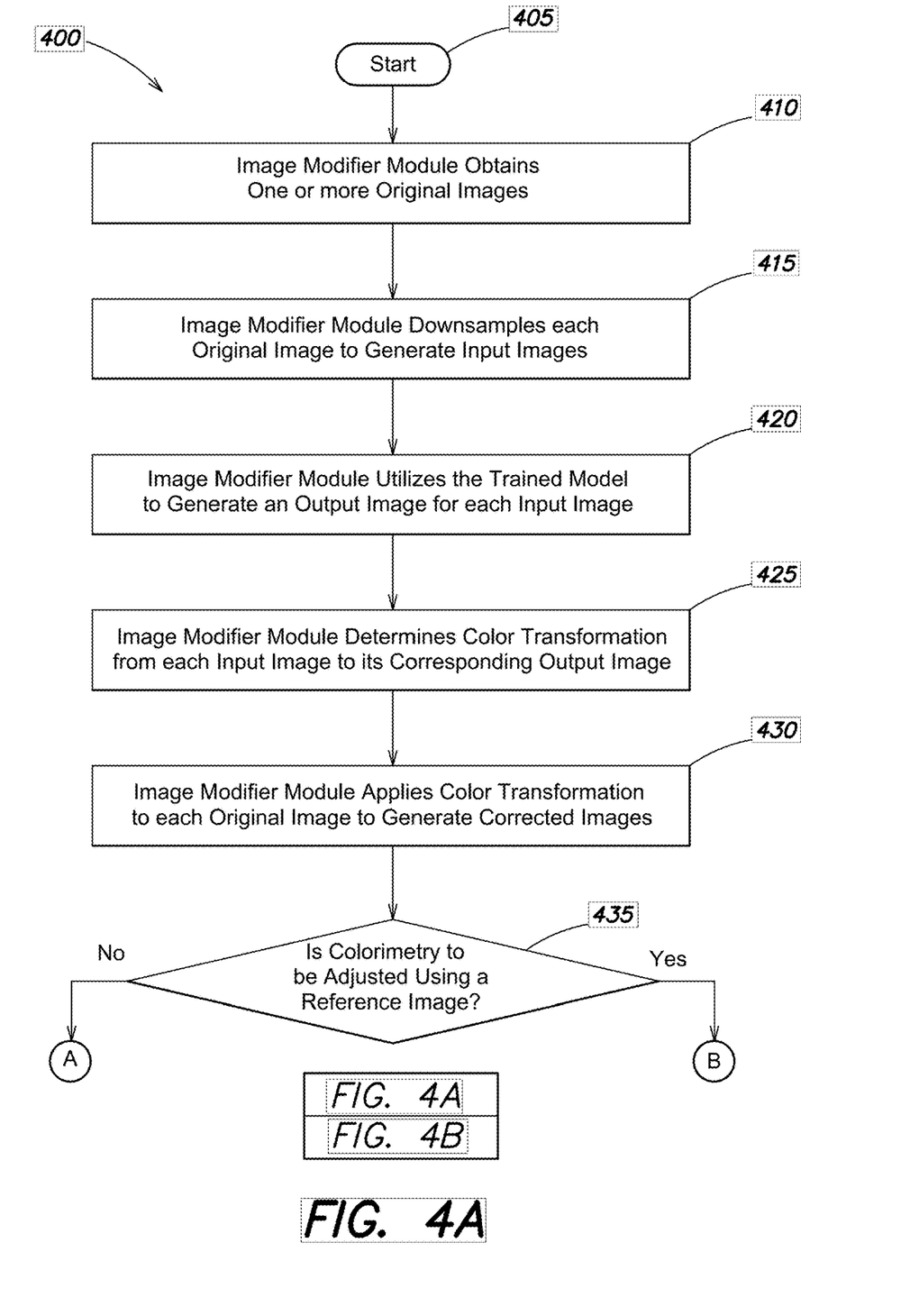
FIGS. 4A and 4B are a flow diagram of a sequence of steps for modifying images to generate corrected images by implementing an algorithm that utilizes the trained model according to the one or more embodiments described herein.
Figure 4B:
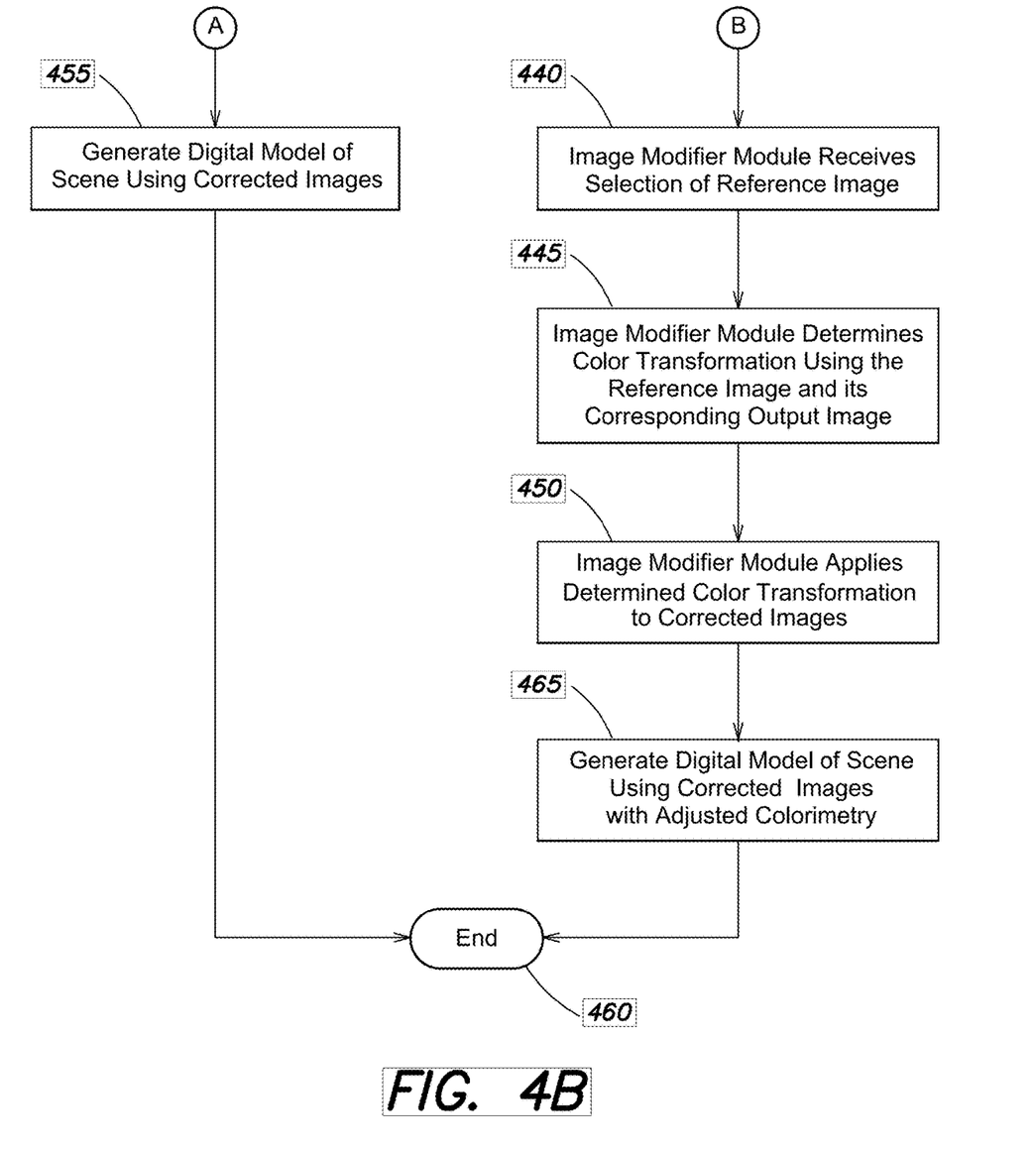

FIGS. 4A and 4B are a flow diagram of a sequence of steps for modifying images to generate corrected images by implementing an algorithm that utilizes the trained model according to the one or more embodiments described herein.

The procedure 400 starts at step 405 and continues to step 410 where the image modifier module 118 obtains one or more original images, i.e., new images. For example, a user operating client device 110 may utilize one or more user interfaces, generated by application 125, to provide one or more original images to the application 125 that includes the image modifier module 118. Alternatively, the image modifier module 118 may obtain the one or more original images from memory (not shown) of the client devices 110 and/or the cloud-based devices 120, and/or the image modifier module 118 may obtain the original images from external storage (not shown).

In an implementation, the one or more original images may be of any scene, wherein the scene may be different than the scenes in the images utilized to generate the trained model 315 as described above with reference to FIGS. 2 and 3. In an embodiment, the original images may be photographs taken with varying light conditions and taken with different cameras having different parameters (e.g., exposure). The original images may have an original resolution and an original size. As an example, let it be assumed that the scene is a bridge and the image modifier module 118 obtains a plurality of images (e.g., photographs) of the bridge. As such, and this example, the images of the bridge are the original images.

The procedure continues to step 415 and the image modifier module 118 downsamples each original images to generate input images. In an implementation, the image modifier module 118 utilizes the same downsampling parameter that is utilized in step 220 of FIG. 2 to generate the trained model 315. For example, the image modifier module 118 may downsample each original image to a image that is 512×512 pixels. In an implementation, the image modifier module 118 downsamples each original image by a factor of 2 using bilinear interpolation, reiterate until the image reaches the desired downsample size, e.g., 512×512 pixels. Continuing with the example of the bridge, the image modifier module 118 downsamples each of the plurality of images of the bridge to generate input images of the bridge.

The procedure continues to step 420 and the image modifier module 118 utilizes the trained model 315 to generate an output image for each input image. Each input image may be provided as input to the trained model 315. The trained model 315 may process each input image, utilizing the determined/learned modifications, to generate a corresponding output image with a transformed illumination. Continuing with the example of the bridge, the image modifier module 118 may provide each input image of the bridge, i.e., each of the downsampled images of the bridge, as input to the trained model 315. The illumination of each input image of the bridge may be modified, based on the determine/learned modifications of the trained model 315, to generate a corresponding output image of the bridge. Therefore, the trained model 315 can be utilized to generate a plurality of output images of the bridge, each of which corresponds to a different input image of the bridge.

The procedure continues to step 425 and the image modifier module 118 determines a color transformation from each input image to its corresponding output image. Continuing with the example of the bridge, the image modifier module 118 determines the color transformation from each input image of the bridge to its corresponding output image of the bridge with the transformed illumination.

In an implementation, the color transformation is determined utilizing a spline fitting approach. To perform the spline fitting, the image modifier module 118 may compute a curve for each of a plurality of color components that make up a color. In an embodiment, the plurality of color components that make up a color include a red color component, a green color component, and a blue color component. For example, the image modifier module 118 may compute a curve for the red color component utilizing a particular input image of the bridge and the corresponding output image of the bridge. The curve would represent the transformation of the red color component from the input image of the bridge to the corresponding output image of the bridge. Therefore, if the curve for the red color component were to be applied to the particular input image of the bridge, the updated red color component in the pixels of the input image of the bridge would substantially match the red color component in the pixels of the corresponding output image of the bridge.

In an implementation, the image modifier module 118 may compute the curve for a color component utilizing a Bezier curve (B(t)) of order 5 as:

$$B(t)=(1-t)^5 P_0 + 5t(1-t)^4 P_1 + 10t^2(1-t)^3 P_2 + 10t^3(1-t)^2 P_3 + 5t^4(1-t)P_4 + t^5 P_5 \quad 0 \leq t \leq 1$$

wherein (1) t represents the color variation for a particular color component (e.g., red, green, or blue color component) in input image (I), where a value of 0 for t represents full black with the inclusion of no color component (e.g., no red color component, no green color component, or no blue color component) and a value of 1 for t represents the full color component (e.g., full red color component with no black, full green color component with no black, or full blue color component with no black); and (2) $P_1$-$P_5$ represent control points that dictate the shape of B(t), i.e., the curve.

In an implementation, control points $P_1$-$P_5$ are evenly spaced such that y=f(x) [x=t]. In an embodiment, a Ceres solver is utilized to solve the non-linear problem of computing the curve parameters for B(t). In alternative embodiments, any of a variety of different solvers and/or algorithms may be utilized to compute the curve parameters for B(t).

Figure 5:
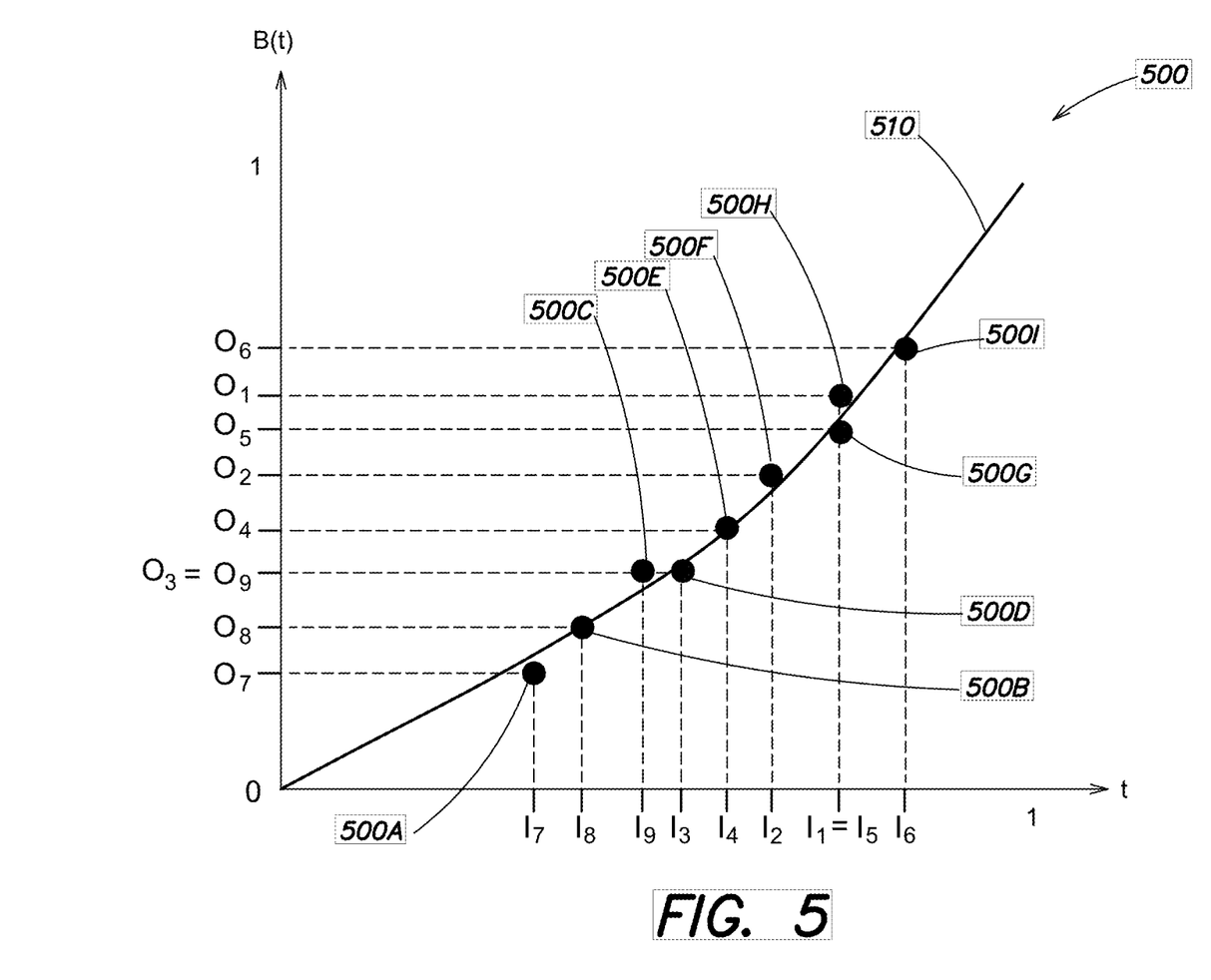
FIG. 5 is a diagram illustrating an exemplary coordinate system that includes curve that is generated according to the one or more embodiments described herein.

FIG. 5 is a diagram illustrating an exemplary coordinate system 500 that includes curve 510 that is generated according to the one or more embodiments described herein. For simplicity and ease of understanding, the example of FIG. 5 is based on a particular input image (e.g., downsampled and generated as described with reference to step 415 of FIG. 4A) and a corresponding output image (e.g., generated as described with reference to step 420 of FIG. 4A) that are a size of 3×3 pixels, e.g., each image has a total of 9 pixels. For this example, let it be assumed that the modifier module 118 is computing B(t) for the green color component. Therefore, computed B(t) represents the transformation of the green color component from the particular input image to its corresponding output image.

As illustrated in FIG. 5, the x-axis of the coordinate system 500 represents the color variant (t) of the green color component from 0 to 1 for the particular input image (I). A value of 0 for t represents full black with no green color component, while a value of 1 for t represents full green color component with no black. As depicted, the x-axis includes a marker for each of the 9 pixels of I. Specifically, marker $I_1$ represents pixel 1 of I, $I_2$ represents pixel 2 of I, $I_3$ represents pixel 3 of I, and so forth. The position of each marker on the x-axis is based on the variant of the green color component in the corresponding pixel I, i.e., the amount of the green color component contained in the corresponding pixel.

For example, and as depicted in FIG. 5, pixel 6 that is represented by marker $I_6$ has the largest color variant value for the green color component in I. Therefore, pixel 6 is the greenest pixel of the 9 pixels of I. Further, pixel 7 that is represented by marker $I_7$ is the pixel with the smallest color variant value for the green color component. Therefore, pixel 7 is the least green pixel of the 9 pixels of I. The other pixels, represented by the other markers on the x-axis, are located at particular positions based on their color variant values for the green color component.

As illustrated in FIG. 5, the y-axis of the coordinate system 500 represents the color variant (t) of the green color component from 0 to 1 for the corresponding output image (O). A value of 0 for t represents full black with no green color component, while a value of 1 for t represents full green color component with no black. As depicted, the y-axis includes a marker for each of the 9 pixels of O. Specifically, marker $O_1$ represents pixel 1 of O, $O_2$ represents pixel 2 of O, $O_3$ represents pixel 3 of O, and so forth. The position of each marker on the y-axis is based on the variant of the color green in the corresponding pixel of O, i.e., the amount of the green color component contained in the corresponding pixel.

For example, and as depicted in FIG. 5, pixel 6 that is represented by marker $O_6$ is the pixel with the largest color variant value for the green color component. Therefore, pixel 6 is the greenest pixel of the 9 pixels of O. Further, pixel 7 of the output image that is represented by marker $O_7$ is the pixel with the smallest color variant value for the green color component. Therefore, pixel 7 is the least green pixel of the 9 pixels of O. Additionally, pixels 3 and 9, respectively represented by markers $O_3$ and $O_9$, are at the same location on the y-axis and thus have the same color variant value for the green color component. As such, pixels 3 and 9 have the same amount of the green color component. The other pixels, represented by the other markers on the y-axis, are located at particular positions based on their color variant values for the green color component.

The image modifier module 118 may compute the curve, representing the transformation of the green color component from the input image to the output image, utilizing the locations of the markers for the input image and the output image.

Specifically, the image modifier module 118 may determine the intersecting locations, for the same pixels of the particular input image and its corresponding output image, to compute the curve B(t). For example, and with reference to FIG. 5, pixel 1 of the particular input image and pixel 1 of the corresponding output image intersect at location 505G. Further, pixel 2 of the particular input image and pixel 2 of the corresponding output image intersect at location 505F. The other pixels of the input image and the corresponding output image, as depicted in FIG. 5, intersect at locations 505A, 505B, 505C, 505D, 505E, 505H, and 505I.

The image modifier module 118 may identify, i.e., fit, a curve 510 (e.g., B(t)) based on the determined intersecting locations, as depicted in FIG. 5. That is, the intersecting locations may define the curve B(t). For example, the image modifier module may search for/identify the curve B(t), with tin the interval [0,1], such that $B(I_i) \approx O_i$. The computed/identified curve may represent the transformation of the green color component from the particular input image to its corresponding output image. In an embodiment, the image modifier module 118 can utilize an optimization package such as a Ceres Solver to identify the curve 510, e.g., B(t), such that $B(I_i) \approx O_i$.

The image modifier module 118 may compute a curve for the red color component and the blue color component in a similar manner. As such, the image modifier module 118 performs the spline fitting for each input image and its corresponding output image by computing a curve for each of the red color component, green color component, and blue color component. As referred herein, a "spline" or a "computed spline" is the set of curves computed based on the performance of the spline fitting. For example, a spline or a computed spline may be a set of curves that consists of a curve for the red color component, a curve for the green color component, and a curve for the blue color component. The three curves together may represent the transformation of color from the particular input image to its corresponding output image.

Continuing with the example of the bridge, the image modifier module 118 computes a set of curves (e.g., curves for red, green, and blue color components) for each input image of the bridge and its corresponding output image of the bridge, where the set of curves represents the transformation in color from the input image of the bridge to its corresponding output image of the bridge. Therefore, if there are 10,000 original images, the image modifier module generate 10,000 input images of the bridge and 10,000 output images of the bridge. As such, the image modifier module 118 would compute the color transformation, e.g., set of curves, from each of the 10,000 input images to its corresponding output image. Therefore, and in this example, the image modifier module 118 would compute 10,000 color transformations.

Referring back to FIG. 4A, and after the image modifier module 118 determines the color transformations, the procedure continues to step 430. At step 430, the image modifier module 118 modifies the color of each original image utilizing a determined color transformation to generate a plurality of corrected images. Specifically, the particular color transformation determined for a particular input image, as described above with reference to step 425, corresponds to a particular original image of the plurality of original images. Therefore, the particular color transformation is applied to the particular original image.

Continuing with the example of the bridge, let it be assumed that a first color transformation is determined for a first input image of the bridge, wherein the first input image of the bridge is generated based on a first original image of the bridge being downsampled. As such, the image modifier module 118 applies the first color transformation to the first original image of the bridge to generate a first corrected image of the bridge. The modifier module 118 would similarly apply each of the other color transformations to each of the other 9,999 original images of the bridge. Based on the application of the color transformation to each of the original images of the bridge, the image modifier module 118 generates 10,000 corrected images of the bridge.

In an implementation, applying the particular color transformation includes using the curves computed for the red, green, and blue components to transform the particular original image to a corrected image.

Advantageously, the one or more embodiments described herein can directly apply the computed splines, which are computed utilizing downsampled images (e.g., 512×512 pixels), to the original images that have an original size and resolution. Therefore, the one or more embodiments described herein do not have to perform the process of upsampling thumbnail images, e.g., images of 512×512 pixels, which may be required by conventional techniques to generate corrected images. Because the one or more embodiments described herein do not have to perform the processing of upsampling, the one or more embodiments described herein preserve computer processing resources when compared to conventional techniques that require upsampling.

Additionally, and after computing the splines, the 512×512 images (e.g., input and output images as described with reference to FIGS. 4A and 5) can be discarded according to the one or more embodiments described herein. In contrast, conventional techniques may have to store both the original images and the modified 512×512 image such that a full-scale modified original image may be computed from the modified 512×512 image. Specifically, and according to conventional techniques, modifications from the modified 512×512 may have to be upscaled and then utilized with the full-scale original image to transform the original image to the modified original image. Therefore, conventional techniques require that the modified 512×512 image be maintained in storage, which requires additional storage requirements. As such, the one or more embodiments described herein conserve computer storage resources when compared to other systems and techniques that have to maintain the modified 512×512 images in storage (e.g., a database, storage device, and/or memory) for further utilization. Based on the above, the one or more embodiments described herein provide an improvement in the existent technology of digital image processing.

Referring back to FIG. 4A, the procedure continues to step 435 and the image modifier module 118 determines if colorimetry is to be adjusted using a reference image. Specifically, using ML to generate the output images, as described above with reference to step 420 of FIG. 4A, may result in a colorimetry that is not desirous. Therefore, and in certain instances, it may be desirable to maintain or preserve the colorimetry of an original received image, e.g., an image received in step 410. As such, the colorimetry may be adjusted based on a particular originally received image, e.g., reference image.

In an implementation, a user operating client device 110 may utilize one or more user interfaces, generated by application 125, to provide an indication as to whether colorimetry is to be adjusted using a reference image. Alternatively, the system may be preconfigured and indicate whether colorimetry is to be adjusted using a reference image.

If, at step 435, it is determined that the colorimetry is not to be adjusted, the procedure proceeds to step 455. At step 455, the model generator module 119 generates a digital model using the corrected images. Specifically, the model generator module 119 utilizes the plurality of corrected images of the scene, that are corrected based on the application of a color transformation to each of the plurality of original images, to generate the digital model of the scene. In an implementation, the model generator module 119 can use the pixels from the corrected images to construct the shape of the digital model, e.g., 3D model, that corresponds to the shapes of the physical objects in the scene. Additionally, the model generator module 119 can use the pixels from the corrected images to construct the texture of the digital model that accurately represents the physical objects in the scene. Continuing with the example of the bridge, the model generator module 119 can use the pixels from the 10,000 corrected images of the bridge to construct the shape of the digital model of the bridge. Additionally, the model generator module 119 can use the pixels from the 10,000 corrected images of the bridge to accurately construct the texture of the digital model of the bridge.

Because the color of the images utilized to generate the model of the bridge are corrected utilizing the trained model 315 that considers different light and color variants, the texture of the generated digital model accurately represents the bridge and does not include unsightly/inaccurate color variations and/or other deficiencies. Additionally, because the generated model has accurate texture, the user experience interacting with the model, to understand the configuration and/or behavior of the physical objects in the scene, is improved. Therefore, the one or more embodiments described herein provide an improvement in the existing technological field of digital image processing and digital model generation. The procedure then ends at step 460.

If, at step 435, it is determined that the colorimetry is to be adjusted using a reference image, the procedure continues to step 440. At step 440, the image modifier module 118 receives a selection of a reference image that is to be used to adjust the colorimetry of the corrected images. In an implementation, the reference image has a reference colorimetry. In an implementation, the reference image is the original image received at step 410 or the input image generated at step 415 from the original image, wherein the original image and the input image have the same colorimetry.

In an embodiment, a user operating client device 110 may utilize one or more user interfaces, generated by application 125, to select a reference image that is to be utilized to adjust the colorimetry of the corrected images. Alternatively, the system may be preconfigured and provide a selection of a reference image that is to be utilized to adjust the colorimetry of the corrected images.

The procedure continues to step 445 and the image modifier module 118 determines a color transformation using the selected reference image and its corresponding output image. To determine the color transformation, the image modifier module 118 may perform a spline fitting to determine the color transformation from the output image generated at step 420 to the input image generated at 415 and having the reference colorimetry. Specifically, the image modifier module 118 may perform the spline fitting, in a similar manner as described above with reference to step 425, to compute a curve for each of the red color component, color component, and the blue color component. The set of generated curves may represent the color transformation from the output image generated in step 425 to the selected reference image, e.g., the input image generated in step 415, having the reference colorimetry.

The procedure continues to step 450 and the image modifier module 118 applies the color transformation, determined to adjust the colorimetry based on a reference image, to each of the corrected images. Specifically, the image modifier module 118 applies the single spline, determined in step 445, to each of the corrected images generated in step 430. As such, the colorimetry of each of the corrected images is adjusted to substantially match the colorimetry of the selected reference image.

The procedure continues to 465 and the model generator module 119 generates a digital model utilizing the corrected images of the scene with the adjust colorimetry. Specifically, the model generator module 119 may generate the digital model of the scene in a similar manner as described above with reference to step 455. The procedure then ends at step 460.

It should be understood that a wide variety of adaptations and modifications may be made to the techniques. For examples, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method, comprising:
receiving a plurality of original images of a scene including at least one physical object, wherein the plurality of original images have an original size;
downsampling each of the original images to generate a plurality of input images, wherein the plurality of input images have a downsampling size that is smaller than the original size;
providing each input image, of the plurality of input images, as input to a trained model that is trained with machine learning;
generating, for each input image and utilizing the trained model, a corresponding to output image, wherein the plurality of corresponding output images have the downsampling size;
determining, by a processor, a color transformation from each input image to the corresponding output image generated from the trained model; and
applying, to each original image of the plurality of original images, the color transformation determined for a particular input image that corresponds to the original image, wherein applying the color transformation generates a plurality of corrected images.

2. The method of claim 1, wherein the downsampling size is an image size that is 512×512 pixels.

3. The method of claim 1, wherein the machine learning utilizes training data that includes input training images and output training images of different scenes, and each of the input training images and output training images have one or more different illumination characteristics.

4. The method of claim 3, wherein the one or more different illumination characteristics include one or more of color variants and one or more color temperatures.

5. The method of claim 1, wherein determining the color transformation from a selected input image to a selected corresponding output image comprises:
determining a curve for each of a plurality of color components, where the curves for the plurality of color components represent the color transformation in first pixels of the selected input image to second pixels of the selected corresponding output image, wherein the plurality of color components include a red color component, a green color component, and a blue color component.

6. The method of claim 1, further comprising:
adjusting a colorimetry of each corrected imaged, of the plurality of corrected images, based on a reference colorimetry of a selected original image.

7. The method of claim 1, further comprising:
generating a digital model of the scene utilizing the corrected images, wherein generating the digital model includes generating a texture for the digital model and the texture represents a surface of the at least one physical object in the scene.

8. A system, comprising:
a processor coupled to a memory, the processor configured to:
receive a plurality of original images of a scene including at least one physical object, wherein the plurality of original images have an original size;
downsample each of the original images to generate a plurality of input images, wherein the plurality of input images have a downsampling size that is smaller than the original size;
provide each input image, of the plurality of input images, as input to a trained model that is trained with machine learning;
generate, for each input image and utilizing the trained model, a corresponding output image, wherein the plurality of corresponding output images have the downsampling size;
determine a color transformation from each input image to the corresponding output image generated from the trained model; and
apply, to each original image of the plurality of original images, the color transformation determined for a particular input image that corresponds to the original image, wherein applying the color transformation generates a plurality of corrected images.

9. The system of claim 8, wherein the downsampling size is an image size that is 512×512 pixels.

10. The system of claim 8, wherein the machine learning utilizes training data that includes input training images and output training images of different scenes, and each of the input training images and output training images have one or more different illumination characteristics.

11. The system of claim 10, wherein the one or more different illumination characteristics include one or more of color variants and one or more color temperatures.

12. The system of claim 8, wherein when determining the color transformation from a selected input image to a selected corresponding output image, the processor is further configured to:
determine a curve for each of a plurality of color components, where the curves for the plurality of color components represent the color transformation in first pixels of the selected input image to second pixels of the selected corresponding output image,
wherein the plurality of color components include a red color component, a green color component, and a blue color component.

13. The system of claim 8, wherein the processor is further configured to:
adjust a colorimetry of each corrected imaged based on a reference colorimetry of a selected original image.

14. The system of claim 1, wherein the processor is further configured to:
generate digital model of the scene utilizing the corrected images, wherein generating the digital model includes generating a texture for the digital model and the texture represents a surface of the at least one physical object in the scene.

15. A non-transitory computer readable medium having software encoded thereon, the software when executed by one or more computing devices operable to:
receive a plurality of original images of a scene including at least one physical object, wherein the plurality of original images have an original size;
downsample each of the original images to generate a plurality of input images, wherein the plurality of input images have a downsampling size that is smaller than the original size;
provide each input image, of the plurality of input images, as input to a trained model that is trained with machine learning;
generate, for each input image and utilizing the trained model, a corresponding output image, wherein the plurality of corresponding output images have the downsampling size;
determine a color transformation from each input image to the corresponding output image generated from the trained model; and
apply, to each original image of the plurality of original images, the color transformation determined for a particular input image that corresponds to the original image, wherein applying the color transformation generates a plurality of corrected images.

16. The non-transitory computer readable medium of claim 15, wherein the downsampling size is an image size that is 512×512 pixels, and wherein the machine learning utilizes training data that includes input training images and output training images of different scenes, and each of the input training images and output training images have one or more different illumination characteristics.

17. The non-transitory computer readable medium of claim 16, wherein the one or more different illumination characteristics include one or more of color variants and color temperatures.

18. The non-transitory computer readable medium of claim 15, wherein when determining the color transformation from a selected input image to a selected corresponding output image, the one or more computing devices further operable to:
determine a curve for each of a plurality of color components, where the curves for the plurality of color components represent the color transformation in first pixels of the selected input image to second pixels of the selected corresponding output image,
wherein the plurality of color components include a red color component, a green color component, and a blue color component.

19. The non-transitory computer readable medium of claim 15, the one or more computing devices further operable to:
adjust a colorimetry of each corrected imaged based on a reference colorimetry of a selected original image.

20. The non-transitory computer readable medium of claim 15, the one or more computing devices further operable to:
generate digital model of the scene utilizing the corrected images, wherein generating the digital model includes generating a texture for the digital model and the texture represents a surface of the at least one physical object in the scene.

* * * * *

UNITED STATES PATENT AND TRADEMARK OFFICE
CERTIFICATE OF CORRECTION

| | |
|---|---|
| PATENT NO. | : 12,020,364 B1 |
| APPLICATION NO. | : 17/715500 |
| DATED | : June 25, 2024 |
| INVENTOR(S) | : Alexandrina Orzan et al. |

Page 1 of 1

It is certified that error appears in the above-identified patent and that said Letters Patent is hereby corrected as shown below:

In the Claims

Column 14, Line 39:
"model, a corresponding to output image, wherein the"
Should read:
"model, a corresponding output image, wherein the"

Signed and Sealed this
Twenty-second Day of April, 2025

Coke Morgan Stewart
*Acting Director of the United States Patent and Trademark Office*